US008885815B1

(12) United States Patent
Velusamy et al.

(10) Patent No.: US 8,885,815 B1
(45) Date of Patent: Nov. 11, 2014

(54) NULL-FORMING TECHNIQUES TO IMPROVE ACOUSTIC ECHO CANCELLATION

(75) Inventors: Kavitha Velusamy, San Jose, CA (US); Amit S. Chhetri, Sunnyvale, CA (US); Ramya Gopalan, Cupertino, CA (US); Wai C. Chu, San Jose, CA (US); Wei Li, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 9 days.

(21) Appl. No.: 13/532,570

(22) Filed: Jun. 25, 2012

(51) Int. Cl.
*H04M 9/08* (2006.01)
*H04R 3/02* (2006.01)
*G10L 21/0216* (2013.01)

(52) U.S. Cl.
CPC ........ *H04R 3/02* (2013.01); *G10L 2021/02166* (2013.01)
USPC .................................................... 379/406.03

(58) Field of Classification Search
CPC ................. G10L 2021/02166; H04R 2430/20; H04R 2410/01; H04M 9/082
USPC .................................................... 379/406.03
See application file for complete search history.

(56) References Cited

U.S. PATENT DOCUMENTS

| | | | |
|---|---|---|---|
| 7,035,415 B2 * | 4/2006 | Belt et al. ...................... 381/92 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2006/0256974 A1 * | 11/2006 | Oxford ........................... 381/66 |
| 2008/0240413 A1 * | 10/2008 | Mohammad et al. .... 379/406.08 |
| 2012/0223885 A1 | 9/2012 | Perez | |

FOREIGN PATENT DOCUMENTS

WO   WO2011088053   7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Alexander Jamal
(74) *Attorney, Agent, or Firm* — Lee & Hayes, PLLC

(57) ABSTRACT

A plurality of microphones of a communication device is grouped into multiple microphone groups, such that each microphone group includes two or more microphones. For each microphone group, output of the corresponding microphones is processed to form an acoustic null in a corresponding spatial direction, such that sound from the corresponding spatial direction is attenuated in the processed output. One of the microphone groups is selected based on various factors leading to maximal echo attenuation and rejection of reverberant components of the room. The selected microphone group is then used to detect sound from a near end talker of the communication device.

21 Claims, 3 Drawing Sheets

NULL-FORMING TECHNIQUES TO IMPROVE ACOUSTIC ECHO CANCELLATION

BACKGROUND

In the field of voice communications, a communication device receives a far end signal from a far end talker, for example, over a network. The far end signal is played via a loudspeaker of the communication device. A near end talker may be relatively far away from the microphones of the communication device, as compared to a distance of the loudspeaker from the microphones. Accordingly, sound played out of the loudspeaker (e.g., sound corresponding to the far end signal) echoes and reaches the microphones, along with sound from the near end talker. Double talk refers to a situation where sound from the near end talker reaches the microphones simultaneously with sound from the far end talker (e.g., from the loudspeaker).

Due to the sound from the loudspeaker reaching the microphones along with the sound from the near end talker, during double talk, a near-to-far ratio may decrease, resulting in poor acoustic performance of the communication device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
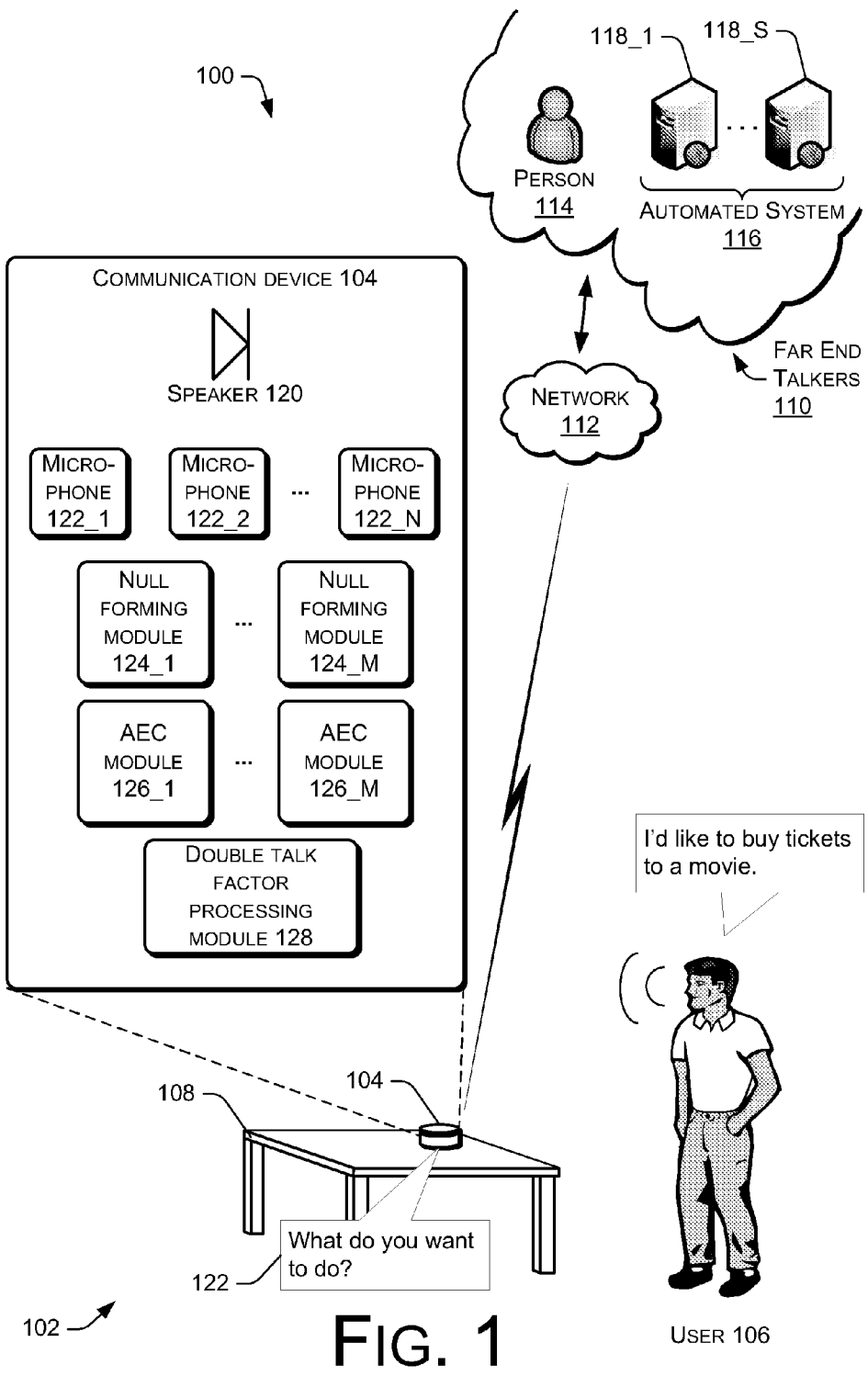
FIG. 1 shows an illustrative architecture set in an example environment that includes a user, or near end talker, communicating with a far end talker through use of a communication device. The communication device is equipped with microphones, a plurality of null forming modules, and a plurality of acoustic echo cancellation modules.

Described herein are techniques to improve acoustic performance of a communication device. The techniques include a null-forming process to form directional acoustic nulls and directional acoustic beams using a microphone array. The acoustic nulls may be oriented in the direction from which the loudspeaker signal is arriving. Forming an acoustic null may comprise attenuating sound captured by the microphones from the direction of the acoustic nulls. At least one of the acoustic beams may be oriented in the direction of a near end talker of the communication device. Forming an acoustic beam may comprise amplifying sound captured by the microphones from the direction of the acoustic beam. In this way, the far-side signal is largely rejected and the near-to-far ratio (NFR) is significantly improved. The following discussion describes a number of computationally efficient techniques that improve acoustic echo cancellation performance.

In one embodiment, a communication device may include a speaker and a plurality of microphones. The communication device may be, for example, a telephone handset, a headset, a smart phone, a conference phone, an electronic voice controlled assistant, or any appropriate consumer electronic device that is capable of producing sound from the speaker and receiving sound in the plurality of microphones.

The speaker may output sound from a far end talker (or play an audio file accessible to the communication device). One or more of the plurality of microphones may receive sound from a near end talker located proximally to the communication device. One or more of the plurality of microphones may also receive sound of the far end talker that is echoed from the speaker. That is, the microphones may receive sound from the near end talker and also receive sound from the far end talker via echo from the speaker. Double talk refers to a situation where sound from the near end talker reaches the microphones simultaneously with sound from the far end talker (e.g., via echo from the speaker). Double talk may decrease the near-to-far ratio, which is an indication of a ratio of (i) signal strength from the near end talker and (ii) signal strength of the far end talker via echo from the loudspeaker. This may also decrease a quality of sound received by the far end talker from the communication device.

In various implementations, null forming techniques may be employed to attenuate the sound of the speaker and enhance the sound of the near end talker in the sound detected by the microphones of the communication device. These techniques increase the near-to-far ratio and also increase the quality of sound received by the far end talker from the communication device.

In one implementation, the microphones of the communication device may be grouped in a plurality of groups, such that each group has two or more microphones. Each group may be associated with a respective null forming module and a respective acoustic error cancellation (AEC) module. The null forming module associated with a specific microphone group processes signals from the microphones of that specific group to form an acoustic null in a specific spatial direction (e.g., in substantially the direction of the device speaker), such that sound captured by the microphones of the specific group from the specific spatial direction is attenuated in the output of the null forming module. The null forming module associated with the specific microphone group also processes signals from the microphones of that specific group to form an acoustic beam in a corresponding direction, such that sound captured by the microphones of the specific group from the corresponding direction (i.e., the direction of the acoustic beam) is amplified in the output of the null forming module. For example, the acoustic null may be formed by each microphone group in substantially the direction of the speaker (this may be possible because the communication device is aware of the geometry of the device, i.e., the direction of the speaker relative to the microphones), whereas a main lobe axis of the acoustic null (i.e., an acoustic beam) for each microphone group may be in a corresponding direction. For example, one microphone group may form the main lobe axis of the acoustic null in the direction of the near end talker, while another microphone group may form the main lobe axis of the acoustic null in a direction that is different from the direction of the near end talker. This formation would decrease an echo produced by the device speaker and increase the sound level from the near end talker in the output of the null forming module of at least one microphone group (e.g., of the microphone group that forms the main lobe axis of the acoustic null in the direction of the near end talker).

The AEC module of the specific microphone group may process the output of the corresponding null forming module, and generate a corresponding double talk factor. As previously discussed, double talk refers to the situation where sound from the near end talker reaches the microphones simultaneously with sound from the far end talker (e.g., from the loudspeaker). The double talk factor determined by the AEC module of a specific group may be an indication of double talk (or an indication of a near-to-far ratio) in the output of the corresponding null forming module. Double talk factors may be generated corresponding to the other groups in a similar manner, thereby generating a plurality of double talk factors corresponding to the plurality of groups.

The various double talk factors may be processed and based thereon, the communication device tunes to and detects sound from the near end talker to increase the near-to-far ratio. Processing of the double talk factors and detecting the sound from the near end talker may be performed in one or more of several different manners.

In one technique, the plurality of double talk factors may be processed to form a combined double talk factor (e.g., which may be an average of the plurality of double talk factors). Once the combined double talk factor is determined, coefficients of adaptive filters in one more of the AEC modules may be adapted to, for example, decrease effects of echo from the speaker in the signals detected by the microphones of the communication device.

In another technique, the plurality of double talk factors may be compared. A specific group having the highest double talk factor value (i.e., which has a lowest double talk, and accordingly, highest near-to-far ratio) may be selected. The highest double talk factor indicates that the selected group has the direction of acoustic null substantially towards the device speaker and the direction of the main lobe axis of the associated null (i.e., the direction of the corresponding acoustic beam) substantially towards the near end talker as compared to the directions for the other microphone groups. Output of the microphones of the selected group (and the corresponding null forming module and AEC module) may thus be processed for detection of the sound from the near end talker. This selection improves acoustic performance of the communication device.

In still another implementation, a direction of the near end talker relative to the communication device may be estimated based, in part, on the specific double talk factor selected as being the highest among all the double talk factors. In yet another implementation, a direction of the near end talker relative to the communication device may be estimated based, in part, on one or more specific double talk factors selected as being higher than a threshold value. Based on information on the estimated direction of the near end talker and the direction of the speaker, the communication device may use, for example, all of the plurality of microphones to detect sound from the near end talker. In another example, based on information on the estimated direction of the near end talker and the direction of the speaker, the communication device may use only one of the microphones (e.g., a microphone that is nearest to the near end talker) to detect sound from the near end talker.

The techniques and systems described herein may be implemented in a number of ways. Example implementations are provided below with reference to the following figures.

Illustrative Environment and System

FIG. 1 shows an illustrative architecture 100, set in an exemplary environment 102, which includes a communication device 104 and a user 106 of the communication device 104. Although only one user 106 is illustrated in FIG. 1, multiple users may use the communication device 104. The user 106 may be located proximal to the communication device 104.

The communication device 104 may be implemented in any number of ways. It may be a telephone handset, a headset, a phone, a portable phone, a tablet or computing device, or any number of electronic devices that is capable of producing sound from a speaker and receiving sound in one or more microphones. In this illustration, the communication device 104 is implemented as an electronic voice controlled assistant physically positioned on a table 108 within the environment 102. In other implementations, it may be placed in any number of locations (e.g., ceiling, wall, in a lamp, beneath a table, on a work desk, in a hall, under a chair, etc.). The device 104 is shown communicatively coupled to far end talkers 110 over a network 112. The far end talkers 110 may include individual people, such as person 114, or automated systems 116 that verbally interact with the user 106. The automated system 116 is shown hosted on one or more servers $118\_1, \ldots, 118\_S$.

The communication device 104 may include a speaker 120 and a plurality of microphones $122\_1, \ldots, 122\_N$, where N is an appropriate integer. In one example described throughout, N is equal to six (i.e., there are six microphones in the communication device 104), although there may be more or less than six microphones in other implementations.

The speaker 120 may be configured to output sound waves produced by the communication device 104. The sound may be generated based on information stored in the communication device 104 (e.g., playing an audio file accessible to the communication device 104) and/or information received by the communication device 104 from another source, such as the far end talkers 110. The speaker 120 may be configured to operate in a loudspeaker mode, where sound waves produced by the speaker 120 reach the user 106 and also one or more of the plurality of microphones $122\_1, \ldots, 122\_N$.

The plurality of microphones $122\_1, \ldots, 122\_N$ may receive sound from the user 106 or other sources in the environment 102. One or more microphones $122\_1, \ldots, 122\_N$ may also receive sound echoed from the speaker 120. Thus, one or more microphones $122\_1, \ldots, 122\_N$ may receive sound from both the user 106 and also receive sound produced by the speaker 120 (i.e., from a far end talker 110), as well as sound from any appropriate sound source proximal to the communication device 104.

In this embodiment, the speaker 120 outputs sound from a far end talker 110, and the user 106 is a near end talker for the communication device 104. Thus, one or more microphones $122\_1, \ldots, 122\_N$ may receive sound from both the near end talker and the far end talker. A near-to-far ratio refers to a ratio of sound energy from the near end talker and sound energy from the far end talker, as detected by the microphones $122\_1, \ldots, 122\_N$ of the communication device 104.

During double talk, one or more microphones $122\_1, \ldots, 122\_N$ may simultaneously receive sound from the near end talker (e.g., from the user 106) and from the far end talker 110 (e.g., via echo from the speaker 120). For the far end talker to clearly listen to the near end talker, during double talk, it may be desirable to attenuate echo from the speaker 120 and enhance sound from the near end talker in the signals detected by the communication device 104 (i.e., increase the near-to-far ratio).

The communication device 104 may also include a plurality of null forming modules $124\_1, \ldots, 124\_M$, a plurality of acoustic echo cancellation (AEC) modules $120\_1, \ldots, 126\_M$, and a double talk factor processing module 128, where M is an appropriate integer. However, in another embodiment and although not illustrated in FIG. 1, the communication device 104 may include a single null forming module (e.g., in such an embodiment, the null forming modules 124_1, ..., 124_M may be combined or integrated in the single null forming module) and/or a single AEC module (e.g., in such an embodiment, the AEC modules 126_1, ..., 126_M may be combined or integrated in the single AEC module).

The null forming modules 124_1, ..., 124_M are configured to process signals from the microphones 122_1, ..., 122_N of the corresponding group such that an acoustic null and an acoustic beam are formed in corresponding spatial directions. Forming an acoustic null by a null forming module in a first direction involves, for example, attenuating sound from the first direction in the output of the null forming module. Forming an acoustic beam by the null forming module in a second direction involves, for example, amplifying sound from the second direction in the output of the null forming module. Formation of acoustic nulls and acoustic beams are described below in more detail with reference to FIGS. 2 and 3. In one embodiment, an AEC module 126 may be associated with a corresponding null forming module 124. For example, the AEC module 126_1 may be associated with the null forming module 124_1, the AEC module 126_2 may be associated with the null forming module 124_2, and so on. The AEC modules 126_1, ..., 126_M are configured to generate, based on an output of a corresponding null forming module, corresponding double talk factors for the groups. The double talk factor of a group is an indication of a level of double talk in an output of the corresponding null forming module.

The double talk processing module 128 is configured to process the double talk factors. In an example, processing the double talk factors may include selecting, from the plurality of double talk factors (corresponding to the plurality of microphone groups), a double talk factor that has a highest value among all the double talk factors (indicating a lowest level of double talk), as will be discussed in more detail herein. In another example, processing the double talk factors may include determining an average of the plurality of double talk factors. Based on processing the double talk factors, the communication device 104 is able to improve the NFR and acoustic performance when detecting sound from the near end talker 106.

Figure 2:
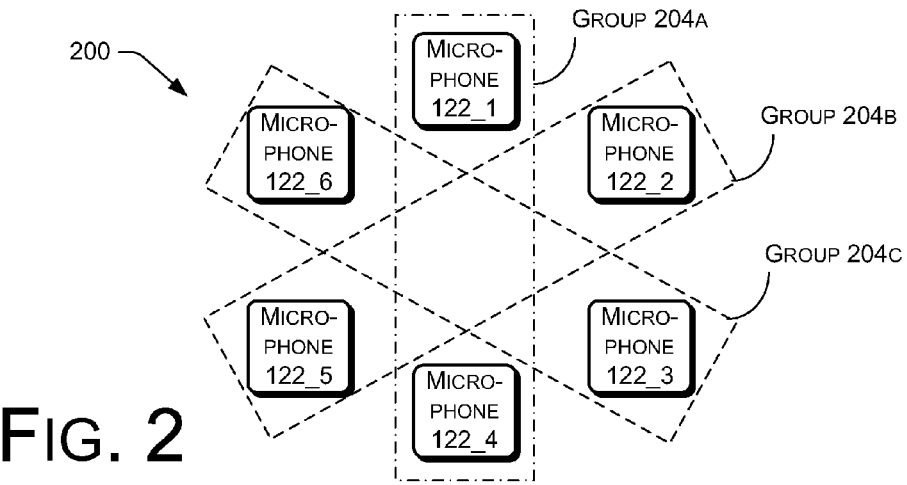
FIG. 2 illustrates an example physical layout of the microphones on the communication device of FIG. 1.

FIG. 2 illustrates an example physical layout 200 of the microphones 122_1, ..., 122_N on the communication device 104. In the example of FIG. 2, N is equal to six, i.e., the communication device 104 has six microphones (although in another embodiment, the communication device 104 may have any other appropriate number of microphones). In the example of FIG. 2, the microphones 122_1, ..., 122_6 are disposed in a circular manner on the communication device 104, although the microphones may be disposed in any other appropriate arrangement on the communication device 104.

The plurality of microphones 122_1, ..., 122_N may be grouped in multiple groups, such that each group has corresponding two or more microphones. For instance, the plurality of microphones 122_1, ..., 122_N may be grouped in M number of groups, where each group may be associated with a respective null forming module and a respective AEC module.

In the example of FIG. 2 (where N=6), the microphones 122_1, ..., 122_6 may be grouped in three groups (i.e., M=3), as represented as groups 204A, 204B and 204C (illustrated using dotted lines in FIG. 2). For example, the group 204A may comprise the microphones 122_1 and 122_4, the group 204B may comprise the microphones 122_2 and 122_5, and the group 204C may comprise the microphones 122_3 and 122_6. In this example, the microphones are grouped in a manner such that a distance between microphones of a specific group is relatively large. In another embodiment, the microphones may be grouped in any other appropriate manner, and one or more groups of microphones may each have more than two microphones. For example, although not illustrated in FIG. 2, a fourth group of microphones may comprise microphones 122_1, 122_3 and 122_5, and a fifth group of microphones may comprise microphones 122_4, 122_2 and 122_6.

As previously noted, each microphone group may be associated with a respective null forming module and a respective AEC module. For example, the microphone group 204A may be associated with the AEC module 126_1 and the null forming module 124_1.

Figure 3:
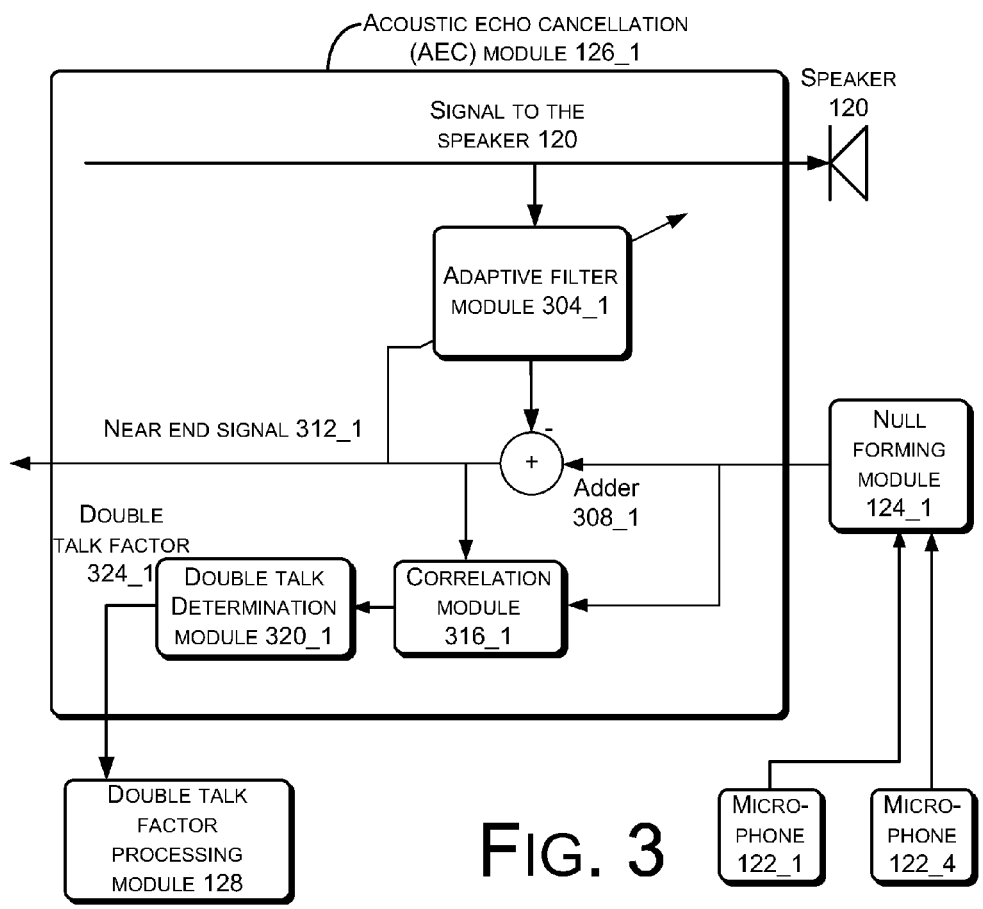
FIG. 3 illustrates the acoustic echo cancellation module and the null forming module corresponding to the microphones of the communication device of FIG. 1.

FIG. 3 illustrates the AEC module 126_1 and the null forming module 124_1 for the microphones of the group 204A. As illustrated in FIG. 3, the null forming module 124_1 may receive signals from the microphones 122_1 and 122_4 (i.e., from the microphones of the group 204A). The null forming module 124_1 may process the signals from the microphones 122_1 and 122_4 to form an acoustic null in substantially a spatial direction of the speaker 120 (e.g., such that sound signal from the direction of the speaker 120 is attenuated in the output of the null forming module 124_1). For example, as the geometry of the communication device 104 (e.g., the direction of the speaker 108 relative to the microphones) is known a priori to the null forming module 124_1, the null forming module 124_1 can form the acoustic null in substantially the spatial direction of the speaker 120. The null forming module 124_1 may further process the signals from the microphones 122_1 and 122_4 to form a main lobe axis of the acoustic null (i.e., an acoustic beam) in a corresponding direction (e.g., such that sound signal from the corresponding direction is amplified in the output of the null forming module 124_1). For example, if the main lobe axis of the acoustic null (i.e., the acoustic beam) is formed in the direction of the user 106, this would decrease (e.g., attenuate) an echo produced by the speaker 120 and increase (e.g., amplify) sound from the user 106 in the output of the null forming module 124_1. In another example, if the main lobe axis of the acoustic null (i.e., the acoustic beam) is formed in a direction that is opposite to the direction of the user 106, this would decrease (e.g., attenuate) sound from the user 106 in the output of the null forming module 124_1. As previously discussed, the null forming modules of each of the microphones groups form the acoustic null in substantially the spatial direction of the speaker 120, and the main lobe axis of the acoustic null (i.e., the acoustic beam) formed by the null forming modules of each of the microphones groups varies (e.g., such that at least one or more microphones group can have the main lobe axis of the acoustic null formed towards the user 106). For example, the direction of acoustic beam formed by the null forming module 124_1 and the microphones 122_1 and 122_4 of the group 204A may be different from directions of acoustic beams formed by each of the null forming modules 124_2, ..., 124_M. In one implementation, the null forming module 124_1 may use an appropriate null forming technique to form the acoustic null. For example, the null forming module 124_1 may introduce a delay in the time domain signals received at the microphone 122_4, combine (i) the delayed signal and (ii) the signal received at the microphone 122_1 to generate an output, and selectively vary the amount of the delay to change the spatial direction of the acoustic null. In another example, the null forming module 124_1 may process the signals received from the microphones 122_1 and 122_4 in the frequency domain to form the acoustic null and the acoustic beam in respective directions. Referring again to FIG. 3, the AEC module 126_1 may comprise an adaptive filter module 304_1, an adder 308_1, a correlation module 316_1 and a double talk estimation module 320_1. The adaptive filter module 304_1 may receive the signal that is transmitted to the speaker 120 (e.g., the far end signal that is to be played in the speaker 120), and may adaptively filter this signal. The adder 308_1 may receive an output of the adaptive filter module 304_1 and an output of the null forming module 124_1. In an example, the adder 308_1 may subtract or remove the output of the adaptive filter module 304_1 from the output of the null forming module 124_1. Accordingly, an output of the adder 308_1 reflects signals captured by the microphones 122_1 and 122_4 (after being processed by the null forming module 124_1) minus a filtered version of the signal (e.g., as filtered by the adaptive filter module 304_1) output by the speaker 120. The output of the adder 308_1 forms a near end signal 312_1, as captured and processed by the microphone group 204A and the corresponding AEC module 126_1. In an embodiment, the near end signal 312_1 is used to adapt the coefficients of the adaptive filter module 304_1.

The correlation module 316_1 may correlate an output of the adder 308_1 (i.e., the near end signal 312_1) with the output of the null forming module 124_1. An output of the correlation module 316_1 may provide an indication of double talk in the output of the null forming module 124_1. For example, if the near end signal 312_1 is highly correlated with the output of the null forming module 124_1 (e.g., if an output of the correlation module 316_1 is high, e.g., 1 or near 1), this may indicate that the output of the null forming module 124_1 does not have substantial contribution from sounds produced by the speaker 120 (i.e., has substantial contributions only from the user 106), which is an indication of a low level of double talk and a high level of near-to-far ratio in the output of the null forming module 124_1. On the other hand, if the near end signal 312_1 has low correlation with the output of the null forming module 124_1 (e.g., if an output of the correlation module 316_1 is low, e.g., 0 or near 0), this may indicate that the output of the null forming module 124_1 has substantial contributions from sounds produced by the speaker 120 (and may not have substantial contributions from the sound produced by the user 106), which is an indication of a high level of double talk and a low near-to-far ratio in the output of the null forming module 124_1.

The double talk determination module 320_1 may receive the output of the correlation module 316_1, and generate a double talk factor 324_1. The double talk factor 324_1 may be an indication of double talk (or an indication of a near-to-far ratio) in the output of the corresponding null forming module 124_1. For example, the double talk factor 324_1 may range from 0 to 1 (i.e., can have any value between 0 and 1), where 0 indicates no correlation between the near end signal 312_1 and the output of the null forming module 124_1, and where 1 indicates full correlation between the near end signal 312_1 and the output of the null forming module 124_1. Thus, the double talk factor 324_1 being 0 indicates very high probability (and high level) of double talk (and a very low near-to-far ratio), and the double talk factor 324_1 being 1 indicates very low probability (and low level) of double talk (and a very high near-to-far ratio) in the output of the null forming module 124_1.

In some implementations, the double talk factor 324_1 may merely be the output of the correlation module 316_1 (i.e., the double talk factor 324_1 may be equal to the output of the correlation module 316_1); in such a scenario, the double talk determination module 320_1 may be redundant.

Although FIG. 3 illustrates the coefficients of the adaptive filter module 304_1 being adjusted based on the near end signal 312_1, in certain implementations, the coefficients of the adaptive filter module 304_1 may be adapted dynamically based on the output of the null forming module 124_1, the double talk factor 324_1, the near end signal 312_1 and/or on other suitable criterion. Dynamically adapting the filter coefficients of the adaptive filter module 304_1 help increase the near-to-far ratio in signals detected by the microphones 122_1 and 122_4 and processed by the null forming module 124_1.

Although FIG. 3 illustrates only one AEC module (e.g., the AEC module 126_1) in detail, other AEC modules (e.g., the AEC module 126_2 corresponding to the group 204B, and the AEC module 126_3 corresponding to the group 204C) may also have structures that are similar to structure of the AEC module 126_1 of FIG. 3. For example, although not illustrated in any of the figures, the AEC module 126_2 may comprise an adaptive filter module 304_2, a correlation module 316_2 and a double talk determination module 320_2. Similarly, the AEC module 126_3 may comprise an adaptive filter module 304_3, a correlation module 316316_3 and a double talk determination module 320_3. Double talk factors 324_2 and 324_3 may also be determined by the AEC modules 126_3 and 126_3, respectively, corresponding to the groups 204B and 204C, respectively.

The double talk factor processing module 128 may receive double talk factors 324_1, 324_2 and 324_3 from the corresponding AEC modules 126_1, 126_2, and 126_3. The double talk factor processing module 128 may process the double talk factors 324_1, 324_2 and 324_3 in a number of ways. For instance, the double talk factor processing module 128 may process the double talk factors to determine a combined double talk factor for the environment 100. For example, the combined double talk factor may be an average (or any other appropriate function) of the double talk factors 324_1, 324_2 and 324_3. The combined double talk factor may be an indication of a level of double talk in the environment 100.

Sound Detection Using Microphones of a Selected Group of Microphones

As previously noted, each of the microphone groups (e.g., groups 204A, 204B and 204C) and the corresponding null forming module may form a main lobe axis of the corresponding acoustic null (i.e., the corresponding acoustic beam) in a corresponding spatial direction (e.g., amplify sound captured by the microphones of the microphone group from the direction of the acoustic beam in the output of the corresponding null forming module). For example, the direction of an acoustic beam formed corresponding to the group 204A may be different from directions of acoustic beams formed corresponding to the groups 204B and 204C. Furthermore, each microphone group may have a direction of the acoustic null substantially along a direction of the speaker 120 (e.g., attenuate sound captured by the microphones of the microphone group from the direction of the speaker 120 in the output of the null forming modules). Accordingly, the double talk factor associated with each microphone group may be different (e.g., the near-to-far ratio for each group may be different). For example, the double talk factor associated with a specific group may be based on the specific direction of acoustic beam formed for that group.

Suppose, for example, the microphone group 204B has the direction of acoustic null towards (or nearly towards) the speaker 120 and has the direction of the acoustic beam towards (or nearly towards) the user 106. In this case, the microphone group 204B may have a relatively high double talk factor 324_2 (indicating a low level of double talk) and a relatively high near-to-far ratio compared to those for the other groups. Thus, in this example, the microphones of the group 204B and the corresponding null forming module 124_2 may detect relatively high sound energy from the user 106 and relatively low sound energy from the speaker 120, compared to those of the other groups.

In another embodiment, the double talk factor processing module 128 may compare the double talk factors 324_1, 324_2 and 324_3, and may select a group that has a highest value of double talk factor (i.e., lowest level of double talk) from among the double talk factors 324_1, 324_2 and 324_3. In the above example where the group 204B has the direction of acoustic null substantially towards the speaker 120 and has the direction of the acoustic beam substantially towards the user 106, the microphone group 204B may have a double talk factor 324_2 that is highest among all the double talk factors (and accordingly, has a lowest level of double talk and a highest near-to-far ratio among all the groups). Accordingly, the double talk factor processing module 128 may select the group 204B.

The selected group 204B may be used for detection of the sound from the user 106. For example, outputs from the null forming module 124_2 (corresponding to the group 204B) and/or the AEC module 126_2 may be used by the communication device 104 to detect sound from the user 106. As an example, using the selected microphone group 204B for detection of sound from the user 106 may improve the near-to-far ratio and enable the far end talker to listen more clearly to the user 106, as compared to a situation where signals from all the microphones (or from randomly selected one or more microphones) are used to detect sound from the user 106. This is because the selected microphone group 204B has a double talk factor 324_2 that is highest among all the double talk factors, indicating that the group 204B has the direction of acoustic null substantially towards the speaker 120 and has the direction of the acoustic beam substantially towards the user 106 compared to the directions for the other groups.

In one example scenario, the user 106 may be mobile relative to the communication device 104. For instance, with reference to FIG. 1, the user 106 is walking around a room while the communication device 104 remains stationary on the table 108. In this case, the direction of the user 106 relative to the communication device 104 changes with time. Accordingly, if currently the double talk factor 324_2 is the highest among all the double talk factors, after some time (e.g., as the user 106 changes direction relative to the communication device 104) another double talk factor may become the highest among all the double talk factors. Hence, all of the AEC modules may adaptively update the corresponding double talk factors for each of the groups 204A, . . . , 204C on a continuous basis. The coefficients of the adaptive filter modules of each of the AEC modules may also be updated adaptively and on a continuous basis.

The coefficients of the adaptive filter module corresponding to the microphone group that has the highest double talk factor may be updated constantly at a relatively fast rate. In this manner, the output of the corresponding null forming module and the output of the corresponding AEC module may be used for detection of sound from the user 106. However, coefficients of the other adaptive filter modules may not need to be updated at the same fast rate.

For example, if the microphone group 204B currently has the highest double talk factor and is selected for detection of sound from the user 106, a rate of adaptation of the coefficients of the adaptive filter 304_2 may be relatively fast compared to rates of adaptation of the coefficients of the adaptive filters 304_1 and 304_3. As an example, the coefficients of the adaptive filter 304_2 may be adapted at every frame of signals received by the AEC module 126_2, while the coefficients of the adaptive filters 304_1 and 340_3 may be adapted at every 10 frame of signals received by the corresponding AEC modules. Slowing down the rate of adaptation for AEC modules that are not selected for detection of sound from the user 106 may, for example, result in an increased computational efficiency of the communication device 104, without significantly adversely affecting the quality of detection of sound from the user 106 by the communication device 104.

Sound Detection Using a Plurality of Microphones

Based on selecting a specific double talk factor that is highest among all the double talk factors, a rough direction of the user 106 relative to the communication device 104 may be estimated. For instance, the user 106 may be located roughly along the direction of the main lobe axis of the acoustic null (i.e., the direction of the corresponding acoustic beam) formed corresponding to the selected group. Furthermore, the communication device 104 may have a priori information about the geometry of the speaker 120 and the microphones 122_1, . . . , 122_N, such as information about the direction of the speaker 120 relative to the microphones 122_1, . . . , 122_N. Based on this direction information, the communication device 104 may use, for example, all the microphones 122_1, . . . , 122_N to detect sound from the user 106. For example, based on estimating the direction of the user 106 relative to the communication device 104, all the microphones 122_1, . . . , 122_N may be used to detect the sound from the user 106 with an increased resolution. In another example, if the microphone group 204B is determined to have the highest double talk factor 324_2 (i.e., lowest level of double talk) among all the double talk factors, (i) the microphones 122_2 and 122_5 of the group 204B and (ii) one or more of the microphones 122_1, 122_3, 122_4 and 122_6 may be used to detect the sound from the user 106.

In yet another example, one or more microphone groups, which have double talk factors that are higher than a threshold value, may be selected, and the microphones of the selected microphone groups may be used to detect the sound from the user 106.

Sound Detection Using a Single Microphone

In another embodiment, the microphones 122_1, . . . , 122_N may be used to estimate the direction of the user 106 relative to the communication device 104 based on, for example, selecting a specific double talk factor that is highest among all the double talk factors. Based on the direction of the user 106 relative to the communication device 104, a single microphone may be used to detect sound from the user 106. For example, it may be determined that the microphone 122_2 is nearest to the user 106. Accordingly, signals from the microphone 122_2 may be used for detecting sounds from the user 106. Using a single microphone (e.g., instead of using the microphones of a selected group of microphones, or instead of using all the microphones) may increase computational efficiency of the communication device 104.

Illustrative Operations

Figure 4:
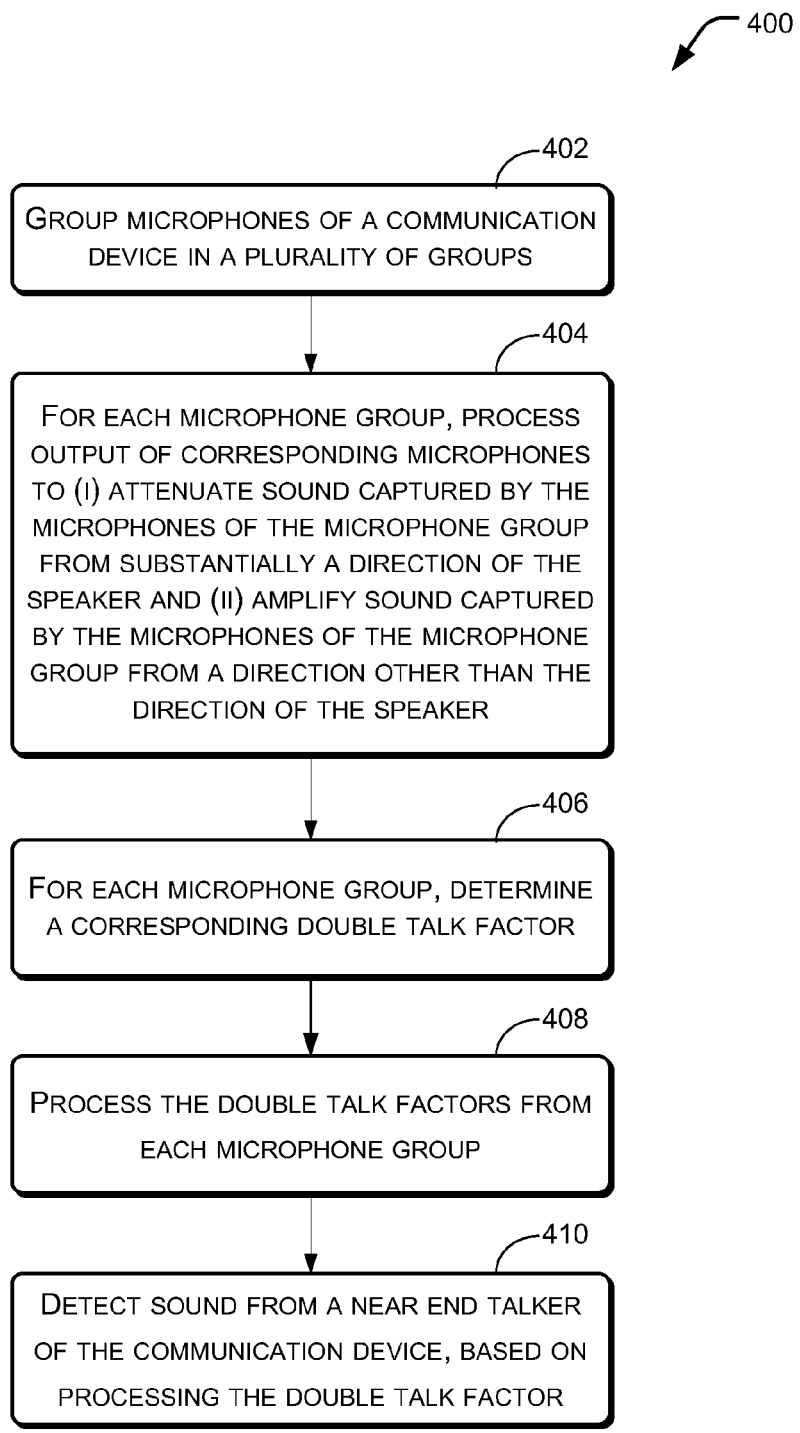
FIG. 4 is a flow diagram of an illustrative process to operate the communication device.

FIG. 4 is a flow diagram of an illustrative process 400 to operate a communication device. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 402, a plurality of microphones (e.g., microphones 122_1, ..., 122_6 of FIG. 2) of a communication device (e.g., the communication device 104 of FIG. 1) are grouped in a plurality of groups, such that each group has two or more microphones. For example, the microphones 122_1, ..., 122_6 are grouped in three microphone groups 204A, 204B and 204C, as illustrated in FIG. 2.

At 404, for each microphone group, output of the corresponding microphones is processed to (i) attenuate sound captured by the microphones of the microphone group from substantially a direction of the speaker and (ii) amplify sound captured by the microphones of the microphone group from a direction other than the direction of the speaker. For example, for the group 204A, the null forming module 124_1 processes the output of the corresponding microphones 122_1 and 122_4, as illustrated in FIG. 3. Based on processing of the output of the corresponding microphones 122_1 and 122_4 by the null forming module 124_1, (i) sound captured by the microphones 122_1 and 122_4 from substantially a direction of the speaker 120 is attenuated in the output of the null forming module 124_1 (e.g., an acoustic null is formed by the null forming module 124_1 in a spatial direction of the speaker 120) and (ii) sound captured by the microphones 122_1 and 122_4 from another direction (e.g., in the direction of the user 106, or in a direction opposite to the user 106, or the like) is amplified in the output of the null forming module 124_1 (e.g., an acoustic beam is formed by the null forming module 124_1 in the another direction).

At 406, for each microphone group, a corresponding double talk factor for the group is determined. For example, the AEC module 126_1 determines the double talk factor 324_1 for the microphones of the group 204A, as illustrated in FIG. 3. A double talk factor of a microphone group is an indication of a level of double talk (and an indication of a near-to-far ratio) in the output of the corresponding null forming module. The double talk factors are determined for all microphone groups.

At 408, the plurality of double talk factors from each of the microphone groups (i.e., all groups) is processed. For example, the double talk factor processing module 128 may process the double talk factors 324_1, 324_2 and 324_3 corresponding to the groups 204A, 204B and 204C, respectively.

At 410, based on processing the plurality of double talk factors, the communication device 104 detects sound from a near end talker (e.g., user 106) of the communication device 104.

As previously discussed, processing of the double talk factors at 408 and detecting the sound at 410 may be performed in one of several different manners. For example, in various embodiments, the double talk factor processing module 128 may process the double talk factors 324_1, 324_2 and 324_3 to form a combined double talk factor (e.g., which may be an average of the double talk factors 324_1, 324_2 and 324_3). The combined double talk factor may be an indication of double talk in the environment 102.

In another embodiment, the double talk factor processing module 128 may compare the double talk factors 324_1, 324_2 and 324_3 and select a group (e.g., group 204B) that has a highest value of double talk factor (e.g., that has a lowest level of double talk) from among the double talk factors 324_1, 324_2 and 324_3. Microphones of the selected group 204B (and the corresponding null forming module and AEC module) may be used for detection of sound from the user 106. For example, if the group 204B is selected, outputs from the null forming module 124_2 (corresponding to the group 204B) and/or the AEC module 126_2 may be used by the communication device 104 to detect sound from the user 106.

In yet another embodiment, based on selecting a specific double talk factor that is highest among all the double talk factors, a direction of the user 106 relative to the communication device 104 may be estimated. Based on information on the estimated direction of the user 106 and the direction of the speaker 120, the communication device 104 may use, for example, all the microphones 122_1, ..., 122_N to detect sound from the user 106. For example, the acoustic beam of one or more microphone groups may be directed towards the user 106 to detect sound from the user 106 with higher resolution.

In another example, based on information on the estimated direction of the user 106 and the direction of the speaker 120, the communication device 104 may use only one of the microphones 122_1, ..., 122_N (e.g., a microphone that is nearest to the user 106) to detect sound from the user 106.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

grouping a plurality of microphones of a communication device in a plurality of microphone groups, each microphone group including two or more microphones of the plurality of microphones and the communication device including a speaker that outputs sound from a first sound source;

for each microphone group, processing output of the microphones of the microphone group to (i) attenuate sound captured by the microphones of the microphone group from substantially a direction of the speaker and (ii) amplify sound captured by the microphones of the microphone group from a direction other than the direction of the speaker;

for each microphone group, determining a respective sound signal from a second sound source based at least in part on (i) the processed output of the microphones of the microphone group and (ii) the sound from the first sound source output by the speaker;

for each microphone group, determining a correlation value that is indicative of a correlation between (i) the processed output of the microphones of the microphone group and (ii) the determined sound signal for the microphone group, the correlation value being indicative of double talk in the processed output of the microphones of the microphone group, wherein a plurality of correlation values is generated corresponding to the plurality of microphone groups;

selecting a correlation value that has a highest value among the plurality of correlation values, wherein the selected correlation value corresponds to a first microphone group of the plurality of microphone groups; and detecting sound from the second sound source based at least in part on the processed output of the microphones of the first microphone group.

2. The method of claim 1, further comprising:
selecting one or more other correlation values that are higher than a threshold value, wherein the one or more other correlation values correspond to one or more other microphone groups of the plurality of microphone groups; and
detecting sound from the second sound source based at least in part on the processed outputs of the microphones of the one or more other microphone groups.

3. The method of claim 1, wherein processing the output of the microphones further comprises:
processing the output of the microphones of the first microphone group to amplify sound captured by the microphones of the first microphone group from a first direction; and
processing the output of the microphones of a second microphone group of the plurality of microphone groups to amplify sound captured by the microphones of the second microphone group from a second direction, where the first direction is different from the second direction.

4. The method of claim 3, wherein processing the output of the microphones further comprises:
processing the output of the microphones of both the first and second microphone groups to attenuate sound captured by the microphones of the first and second microphone groups from substantially the direction of the speaker.

5. The method of claim 1, further comprising:
based at least in part on selecting the correlation value, estimating a direction of the second sound source relative to the communication device, wherein the estimated direction of the second sound source relative to the communication device is substantially a direction in which sound captured by the microphones of the first microphone group is amplified.

6. The method of claim 5, further comprising:
for each microphone group, further processing output of the microphones of the microphone group to amplify sound captured by the microphones of the microphone group from the estimated direction of the second sound source relative to the communication device.

7. The method of claim 1, wherein determining the respective sound signal further comprises:
for each microphone group, determining the respective sound signal from the second sound source based at least in part on removing (i) the sound from the first sound source output by the speaker from (ii) the processed output of the microphones of the microphone group.

8. A communication device comprising:
a speaker;
a plurality of microphones, wherein the plurality of microphones are grouped in a plurality of microphone groups such that each microphone group of the plurality of groups comprises two or more corresponding microphones of the plurality of microphones;
a plurality of null forming modules, wherein each of the plurality of null forming modules is associated with a respective microphone group of the plurality of microphone groups, and wherein each of the plurality of null forming modules is configured to process output of the microphones of the corresponding microphone group to (i) attenuate sound captured by the microphones of the microphone group from substantially a direction of the speaker and (ii) amplify sound captured by the microphones of the microphone group from a respective direction other than the direction of the speaker; and
one or more processing modules including at least one module that selects at least a first microphone group from the plurality of microphone groups based at least in part on the processing of the output of the microphones of the corresponding microphone groups.

9. The communication device of claim 8, the one or more processing modules further comprising:
a plurality of acoustic echo cancellation (AEC) modules, wherein each of the plurality of AEC modules is associated with a respective microphone group of the plurality of microphone groups, wherein one of more of the plurality of AEC modules are configured to detect sound from a sound source that is different from the speaker.

10. The communication device of claim 9, wherein each of the plurality of AEC modules is configured to:
determine a respective sound signal from the sound source, based at least in part on (i) an output of the corresponding null forming module and (ii) the sound output by the speaker; and
generate a corresponding correlation value indicating a level of double talk in the output of the corresponding null forming module, such that a plurality of correlation values are generated corresponding to the plurality of microphone groups.

11. The communication device of claim 10, wherein the at least one module that selects at least the first microphone group comprises:
a double talk factor processing module configured to process the plurality of correlation values by selecting a first correlation value from the plurality of correlation values, wherein the first correlation value corresponds to the first microphone group of the plurality of microphone groups and the selecting of the first microphone group is based at least in part on the selecting of the first correlation value,
wherein the communication device is configured to detect sound from the sound source using signals output from the microphones of the first microphone group.

12. The communication device of claim 11, wherein the double talk factor processing module is further configured to select the first correlation value based on determining that the first correlation value has a highest value among the plurality of correlation values.

13. The communication device of claim 10, wherein each of the plurality of AEC modules is configured to generate, based at least in part on an output of a corresponding null forming module, a corresponding correlation value, such that a plurality of correlation values are generated corresponding to the plurality of microphone groups, the communication device further comprising:
a double talk factor processing module configured to select a first correlation value from the plurality of correlation values, wherein the first correlation value corresponds to a first microphone group and the selecting of the first microphone group is based at least in part on the selecting of the first correlation value; and
the communication device is configured to estimate a direction of the sound source based at least in part on the first correlation value.

14. The communication device of claim 13, wherein the estimated direction of the sound source is substantially a direction in which sound captured by the microphones of the first microphone group is amplified.

15. One or more non-transitory computer-readable media storing computer-executable instructions that, when executed, cause one or more processors to perform acts comprising:
- grouping a plurality of microphones of a communication device in a plurality of microphone groups, such that each microphone group comprises two or more microphones;
- for each microphone group, processing output of microphones of the microphone group to amplify sound captured by the microphones of the microphone group from a respective particular direction;
- based at least in part on the processing the output of the microphones of each of the microphone groups, selecting a first microphone group from the plurality of microphone groups; and
- detecting sound from a sound source based at least in part on selecting the first microphone group.

16. The one or more non-transitory computer-readable media of claim 15, wherein the acts further comprise:
- for each microphone group, determining a near-to-far ratio for the processed output of the microphones of the microphone group, wherein the near-to-far ratio is an indication of a ratio of (i) a strength of sound from the sound source in the processed output of the microphones of the microphone group and (ii) a strength of sound from a speaker in the processed output of the microphones of the microphone group, the sound from the speaker being received by the microphones of the microphone group via echo from the speaker, the sound source being different from the speaker,
- wherein selecting the first microphone group further comprises:
  - selecting the first microphone group based at least in part on a corresponding first near-to-far ratio having a highest value among a plurality of near-to-far ratios corresponding to the plurality of microphone groups.

17. The one or more non-transitory computer-readable media of claim 16, wherein the acts further comprise estimating, based at least in part on selecting the first microphone group, a direction of the sound source relative to the communication device.

18. The one or more non-transitory computer-readable media of claim 17, wherein the estimated direction of the sound source is substantially a direction in which sound captured by the microphones of the first microphone group is amplified.

19. The one or more non-transitory computer-readable media of claim 17, wherein detecting sound from the sound source further comprises:
- based at least in part on estimating the direction of the sound source, detecting sound from the sound source using a first microphone of the plurality of microphones, wherein the first microphone is nearest to the sound source among the plurality of microphones.

20. The one or more non-transitory computer-readable media of claim 17, wherein the acts further comprise:
- for each microphone group, further processing output of microphones of the microphone group to amplify sound captured by the microphones of the microphone group from the estimated direction of the sound source.

21. The one or more non-transitory computer-readable media of claim 16, wherein the acts further comprise:
- for each microphone group, processing output of microphones of the microphone group to attenuate sound captured by the microphones of the microphone group from substantially a direction of a speaker associated with the communication device.

\* \* \* \* \*